US012224170B2

(12) United States Patent
Sheils et al.

(10) Patent No.: US 12,224,170 B2
(45) Date of Patent: Feb. 11, 2025

(54) CHARGED PARTICLE DETECTOR

(71) Applicant: ADAPTAS SOLUTIONS PTY LTD, Clyde New South Wales (AU)

(72) Inventors: Wayne Sheils, Clyde (AU); Richard Stresau, Clyde (AU); Kevin Hunter, Clyde (AU)

(73) Assignee: ADAPTAS SOLUTIONS PTY LTD, Clyde (AU)

( * ) Notice: Subject to any disclaimer, the term of this patent is extended or adjusted under 35 U.S.C. 154(b) by 0 days.

(21) Appl. No.: 16/617,963

(22) PCT Filed: Jun. 1, 2018

(86) PCT No.: PCT/AU2018/050545
§ 371 (c)(1),
(2) Date: Nov. 27, 2019

(87) PCT Pub. No.: WO2018/218318
PCT Pub. Date: Dec. 6, 2018

(65) Prior Publication Data
US 2020/0194246 A1 Jun. 18, 2020

Related U.S. Application Data

(60) Provisional application No. 62/514,029, filed on Jun. 2, 2017.

(51) Int. Cl.
*H01J 49/02* (2006.01)
*H01J 43/30* (2006.01)
(Continued)

(52) U.S. Cl.
CPC ............ *H01J 49/025* (2013.01); *H01J 43/30* (2013.01); *H01J 49/0031* (2013.01); *H01J 49/4255* (2013.01)

(58) Field of Classification Search
CPC .. H01J 49/00–4265; H01J 43/30; H01J 43/18; H01J 49/025; H01J 49/0031; H01J 49/4255
(Continued)

(56) References Cited

U.S. PATENT DOCUMENTS 3,898,456 A 8/1975 Dietz
4,972,083 A * 11/1990 Taya .................... H01J 49/025 250/296
(Continued)

FOREIGN PATENT DOCUMENTS

CN 102822939 A 12/2012
CN 103270574 A 8/2013
(Continued)

OTHER PUBLICATIONS

'Models 14520 and 14521 for General Quadrupole Analogue applications' from ETP Electron Multipliers, 2001 (Year: 2001).*
(Continued)

*Primary Examiner* — Eliza W Osenbaugh-Stewart
(74) *Attorney, Agent, or Firm* — David D. Brush; Westman, Champlin & Koehler, P.A.

(57) ABSTRACT

Components of scientific analytical equipment and to complete items of analytic equipment. An apparatus and methods useful for detecting an ion in mass spectrometry applications are provided. The apparatus may include an electron multiplier having a high sensitivity and low sensitivity sections, or the combination of an electron multiplier with a separately powered conversion dynode (and particularly a high energy conversion dynode), or the combination of a conversion dynode that is physically incorporated within or about an electron multiplier.

5 Claims, 13 Drawing Sheets

(51) Int. Cl.
*H01J 49/00* (2006.01)
*H01J 49/42* (2006.01)

(58) Field of Classification Search
USPC .......................................................... 250/282
See application file for complete search history.

(56) References Cited

U.S. PATENT DOCUMENTS

| | | | | |
|---|---|---|---|---|
| 5,374,827 | A * | 12/1994 | Roy ...................... | H01J 37/244 250/397 |
| 5,463,219 | A | 10/1995 | Buckley et al. | |
| 6,707,034 | B1 * | 3/2004 | Yamaguchi ........... | H01J 49/025 250/281 |
| 9,293,307 | B2 | 3/2016 | Kovtoun et al. | |
| 10,615,019 | B2 | 4/2020 | Hirano | |
| 2004/0041092 | A1 | 3/2004 | Hamamatsu | |
| 2011/0001043 | A1 * | 1/2011 | Wenzel ................... | H01J 43/22 250/282 |
| 2012/0074309 | A1 | 3/2012 | Hirano et al. | |
| 2013/0264474 | A1 | 10/2013 | Kholomeev et al. | |
| 2015/0162174 | A1 | 6/2015 | Badiei et al. | |
| 2015/0187550 | A1 * | 7/2015 | Hirano .................. | H01J 43/025 250/281 |
| 2015/0219607 | A1 | 8/2015 | Fujita | |

FOREIGN PATENT DOCUMENTS

| | | | |
|---|---|---|---|
| CN | 104641450 | A | 5/2015 |
| CN | 104752145 | A | 7/2015 |
| EP | 2899746 | A1 | 7/2015 |
| JP | S6316233 | A | 1/1988 |
| WO | 2002086944 | A1 | 10/2002 |

OTHER PUBLICATIONS

'Photomultiplier Tubes: Basics and Applications' by Hamamatsu, third edition, 2006, p. 91 (Year: 2006).*

Knoll 'Radiation Detection and Measurement' third edition, 2000 (Year: 2000).*

International Search Report dated Aug. 1, 2018 for or corresponding International Patent Application PCT/AU2018/050545 filed on Jun. 1, 2018.

Written Opinion Report dated Aug. 1, 2018 for corresponding International Patent Application PCT/AU2018/050545 filed Jun. 1, 2018.

Australian Examiner Report dated Aug. 26, 2022, for corresponding Australian Patent Application No. 2018276071.

Supplementary European Search Report dated Jan. 20, 2021, for corresponding European Application No. 18809917.

European Search Opinion dated Feb. 1, 2021, for corresponding European Application No. 18809917.

English translation and copy of Japanese Office Action dated May 23, 2023, for corresponding Japanese Application No. 2022-135958.

English translation of Chinese Office Action dated Sep. 8, 2022 for corresponding Chinese Application No. 201880035699.1.

* cited by examiner

CHARGED PARTICLE DETECTOR

The present application is a Section 371 National Stage Application of International Application No. PCT/AU2018/050545, filed Jun. 1, 2018, and published as WO 2018/218308 A1 on Dec. 6, 2018, in English, which claims priority from U.S. provisional patent application 62/514,029, filed Jun. 2, 2017, which are incorporated herein by reference in their entireties.

FIELD OF THE INVENTION

The present invention relates generally to components of scientific analytical equipment, and to complete items of analytic equipment. More particularly, but not exclusively, the invention relates to apparatus and methods useful for detecting an ion in mass spectrometry applications.

BACKGROUND TO THE INVENTION

In many scientific applications, it is necessary to amplify an electron signal. For example, in a mass spectrometer the analyte is ionized to form a range of charged particles (ions). The resultant ions are then separated according to their mass-to-charge ratio, typically by acceleration and exposure to an electric or magnetic field. The separated signal ions impact on an ion detector surface to generate one or more secondary electrons. Results are displayed as a spectrum of the relative abundance of detected ions as a function of the mass-to-charge ratio.

In other applications the particle to be detected may not be an ion, and may be a neutral atom, a neutral molecule, an electron, or a photon. In any event, a detector surface is still provided upon which the particles impact.

The secondary electrons resulting from the impact of an input particle on the impact surface of a detector are typically amplified by an electron multiplier. Electron multipliers generally operate by way of secondary electron emission whereby the impact of a single or multiple particles on the multiplier impact surface causes single or (preferably) multiple electrons associated with atoms of the impact surface to be released.

For some applications, particle detectors having very high levels of sensitivity are required so as to allow for the detection of single ions amongst other species. For example, inductively coupled plasma mass spectrometry (ICP-MS) converts the atoms under analysis to ions (at the ICP source). The so-formed ions are then separated and detected by the mass spectrometer. ICP-MS typically requires the use of specialised electron multipliers to process the extremely wide dynamic range of the output. There is known in the prior art a range of multipliers which can cope with very high level signals resulting from multiple ions whilst still being able to detect the very low signal which originate from the impact of a single ion.

Irrespective of the level of sensitivity, further improvements in dynamic range are nevertheless desired in the art. To the best of the Applicant's knowledge there has been no substantive improvements in the dynamic range of these instruments since their introduction in the 1990's.

Improvements in the areas of detection efficiency, linearity of response, gain stability, differential drift and service life are also generally desired in the art.

It is further desirable in the art to simplify the construction of mass spectrometry instruments, and also to facilitate maintenance and replacement of any conversion surface and/or electron emissive surface.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect of the invention, there is provided an apparatus for detecting a charged particle, the apparatus comprising a conversion dynode configured to emit one or more secondary electrons or ions upon impact by a particle, an electron multiplier configured to form an amplified electron signal output from the one or more secondary electrons or ions emitted by the conversion dynode.

In one embodiment of the first aspect, the electron multiplier has a relatively low sensitivity section and a relatively high sensitivity section.

In one embodiment of the first aspect, the conversion dynode is powered separately to the electron multiplier.

In one embodiment of the first aspect, the conversion dynode is a high energy conversion dynode.

In one embodiment of the first aspect, the conversion dynode is physically incorporated within or about the electron multiplier.

In a second aspect, the present invention provides an apparatus for detecting a charged particle, the apparatus comprising a conversion dynode configured to emit one or more secondary electrons or ions upon impact by a particle, an electron multiplier configured to form an amplified electron signal output from the one or more secondary electrons or ions emitted by the conversion dynode, wherein the conversion dynode is physically incorporated within or about the electron multiplier.

In one embodiment of the second aspect, the conversion dynode is powered separately to the electron multiplier and/or not electrically coupled to a dynode of the electron multiplier.

In one embodiment of the second aspect, wherein the electron multiplier has a relatively low sensitivity section and a relatively high sensitivity section.

In one embodiment of the second aspect, the conversion dynode is powered separately to the electron multiplier and/or not electrically coupled to a dynode of the electron multiplier.

In one embodiment of the second aspect, the conversion dynode is a high energy conversion dynode.

In a third aspect, the present invention provides an apparatus for detecting a charged particle, the apparatus comprising a conversion dynode configured to emit one or more secondary electrons or ions upon impact by a particle, an electron multiplier configured to form an amplified electron signal output from the one or more secondary electrons or ions emitted by the conversion dynode, wherein the conversion dynode is powered separately to the electron multiplier and/or not electrically coupled to a dynode of the electron multiplier.

In one embodiment of the third aspect, the conversion dynode is a high energy conversion dynode.

In one embodiment of the third aspect, the conversion dynode is physically incorporated within or about the electron multiplier.

In one embodiment of the third aspect, the electron multiplier has a relatively low sensitivity section and a relatively high sensitivity section.

In one embodiment of the first aspect or the second aspect or the third aspect, the electron signal output of the relatively high sensitivity section is a relatively high gain electron signal output, compared with the electron signal output of the relatively low sensitivity section.

In one embodiment of the first aspect or the second aspect or the third aspect, the relatively low sensitivity section is an analog section, and the relatively high sensitivity section is a digital section configured to output a range of pulse heights.

In one embodiment of the first aspect or the second aspect or the third aspect, the digital section output is configured so as to be usable as an input in an electronic counting circuit.

In one embodiment of the first aspect or the second aspect or the third aspect, the relatively high sensitivity section and the relatively low sensitivity section each comprise one or more discrete dynodes, wherein the electron multiplier is configured such that the relatively low sensitivity section provides a relatively low gain electron signal output, and the relatively high sensitivity section provides a relatively high gain electron signal output.

In one embodiment of the first aspect or the second aspect or the third aspect, the relatively high sensitivity section and/or the relatively low sensitivity section(s) is/are configured to operate at an output current of at least about 5, 10, 15, 20, 25, 30, 35, 40, 45, 50, 75 or 100 μA.

In one embodiment of the first aspect or the second aspect or the third aspect, the conversion dynode has an applied voltage of greater than about +1, +2, +3, +4, +5, +6, +7, +8, +9 +10 kV, +15 kV, or +20 kV or less than about −1, −2, −3, −4, −5, −6, −7, −8, −9, −10, −15 or −20 kV.

In one embodiment of the first aspect or the second aspect or the third aspect, a voltage applied to the conversion dynode is decoupled from a voltage applied to the relatively low sensitivity section of the electron multiplier.

In one embodiment of the first aspect or the second aspect or the third aspect, the relatively low sensitivity section comprises at least about 6, 7, 8, 9, 10, 11, 12, 13, 14, 15 or 16 discrete dynodes.

In one embodiment of the first aspect or the second aspect or the third aspect, the relatively high sensitivity section comprises at least about 10, 11, 12, 13, 14, 15, 16, 17, or 18 discrete dynodes.

In one embodiment of the first aspect or the second aspect or the third aspect, the conversion dynode is integral with the structure of the electron multiplier, immediately adjacent the electron multiplier, or within the electron multiplier structure.

In one embodiment of the first aspect or the second aspect or the third aspect, the voltage bias applied to the conversion dynode is lower than the voltage bias applied in the case of an identical apparatus although having a conversion dynode disposed distally thereto, the lower voltage being such that any deleterious effect normally associated with bringing a conversion dynode into close proximity to the electron multiplier is decreased or obviated.

In one embodiment of the first aspect or the second aspect or the third aspect, the voltage bias applied to the conversion dynode is less than about 5, 4, 3, 2 or 1 kV In a fourth aspect, the present invention provides a mass spectrometry instrument comprising the apparatus of any embodiment of the first aspect.

In one embodiment of the fourth aspect, the mass spectrometry instrument is configured to detect a target particle present at a concentration of less than about 1 part in $10^{10}$, 1 part in $10^{11}$, 1 part in $10^{12}$, 1 part in $10^{13}$, 1 part in $10^{14}$, or 1 part in $10^{15}$.

In one embodiment of the fourth aspect, the mass spectrometry instrument is configured to perform inductively coupled plasma mass spectrometry.

In a fifth aspect, the present invention provides a method of performing a mass spectrometry analysis of a sample, the method comprising the step of introducing a sample for analysis into the mass spectrometry instrument of any embodiment of the first aspect, and operating the instrument so as to provide one or more electron signal output(s).

In one embodiment of the fifth aspect, the mass spectrometry analysis is capable of detecting a target particle present at a concentration of less than about 1 part in $10^{10}$, 1 part in $10^{11}$, 1 part in $10^{12}$, 1 part in $10^{13}$, 1 part in $10^{14}$, or 1 part in $10^{15}$.

In one embodiment of the fifth aspect, the mass spectrometry is inductively coupled plasma mass spectrometry.

DETAILED DESCRIPTION OF THE INVENTION INCLUDING PREFERRED EMBODIMENTS

Figure 1A:
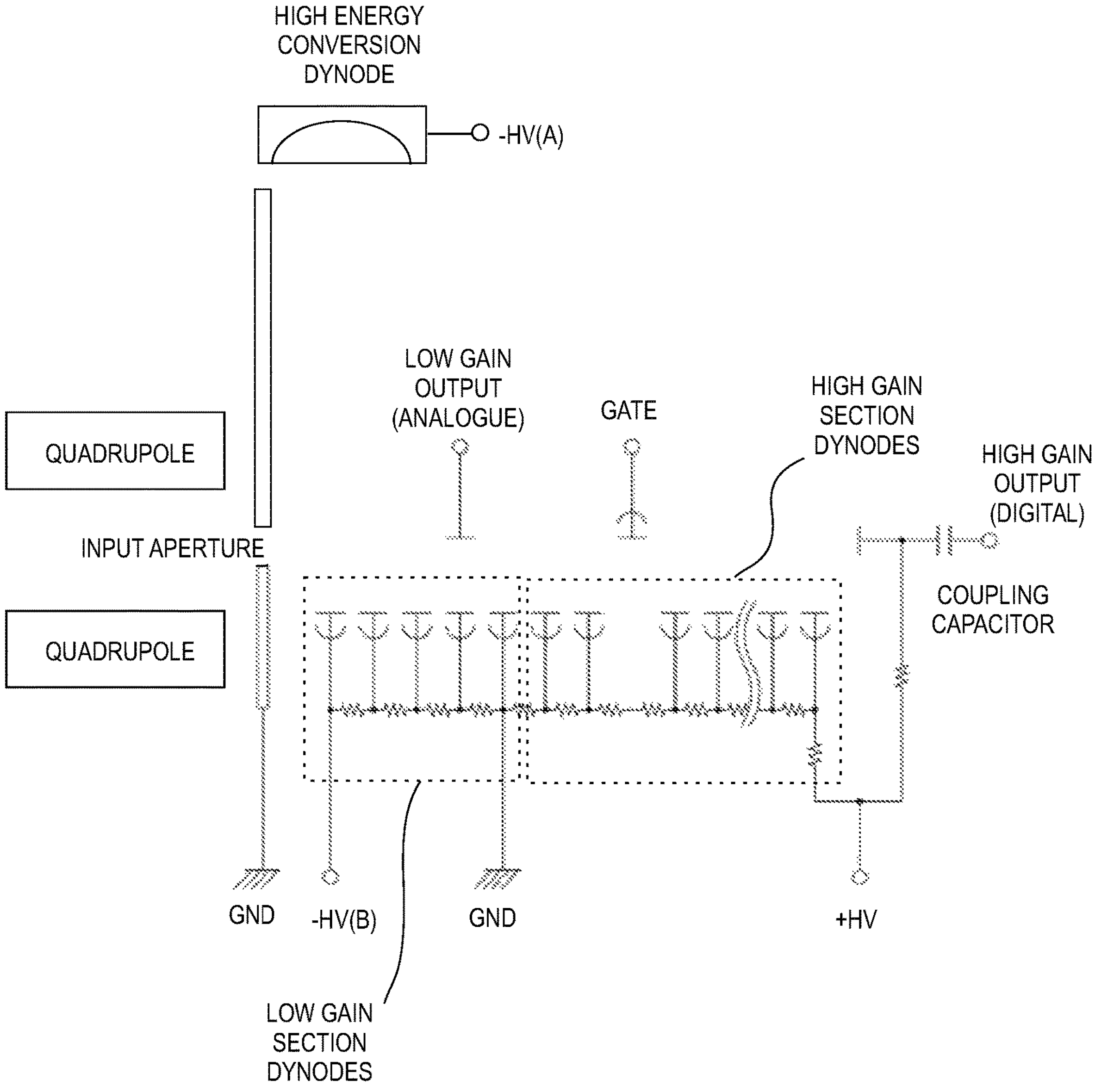
FIG. 1A shows diagrammatically a preferred apparatus of the present invention which is useful in the context of a detector for a mass spectrometry apparatus.

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

It will be appreciated that not all embodiments of the invention described herein have all of the advantages disclosed herein. Some embodiments may have a single advantage, while other may have no advantage at all and are merely a useful alternative to the prior art.

The present invention is predicated at least in part on Applicant's finding that an electron multiplier having a high sensitivity and low sensitivity sections, or the combination of an electron multiplier with a separately powered conversion dynode (and in some embodiments a high energy conversion dynode), or the combination of a conversion dynode that is physically incorporated within or about an electron multiplier provides for a detector apparatus having certain improvement over detector apparatus of the prior art.

As used herein, the term "conversion dynode" is intended to include any contrivance capable of emitting a secondary electron (or ion) upon impact of a particle such as a charged or uncharged atom, a charged or an uncharged molecule, a charged or an uncharged subatomic particle such as a neutron or a proton or an electron or a photon. According to the present invention, the conversion dynode may be operated so as to have a relatively high electrical potential compared to dynodes dedicated to amplification.

In some embodiments, the dynode is a "high energy conversion dynode". The electrical potential may be measured relative to ground, or to another component of the apparatus as appropriate. While there may exist some relativity in defining a high energy conversion dynode, it will often be the case that the high energy conversion dynode and the first dynode of the low gain section of the electron multiplier are commonly grounded, and the high energy conversion dynode is biased at a voltage further away from zero than the first dynode of the low gain section of the electron multiplier.

As is understood by the skilled artisan, the ion-to-electron (and ion-to-ion) conversion efficiency generally increases with the speed at which ions impact the surface of the conversion dynode. Accordingly, the conversion dynode is typically designed to increase the speed of the incident ions so as to optimize conversion efficiency as far as practicable.

The incorporation of a separately powered discrete conversion dynode in the detector apparatus allows for that dynode to be biased separately, and to a higher voltage, as compared with the dynodes (and particular the first dynode of the low gain section) of the electron multiplier. An advantage of this arrangement is that it avoids the need to elevate the bias voltage of the electron multiplier section over that needed for electron amplification to occur. In prior art detectors used for ICP-MS, the initial voltage of the electron multiplier is elevated to about −1600V to ensure adequate ion to electron conversion efficiency. However, in the present invention the voltage bias of the conversion dynode is elevated (so as to ensure a desired conversion efficiency) while the electron multiplier (and particularly the low gain section) can be biased at a lower voltage. Consequently, the low gain electron multiplier section (being operated at a lower voltage) is provided with greater voltage "headroom" which in turn provides for a longer service life.

Extending the service life of a detector may provide the added advantages of slowing the rate of gain change and/or slowing the rate of differential drift over time.

The high energy conversion dynode typically has a dedicated power supply, substantially separate to that of the electron multiplier sections of the apparatus. The use of a separate power supply may allow for better independent control of the voltage and/or current applied to the high energy conversion dynode. The use of a discrete power supply may also allow for better control of voltages and/or currents applied to the electron multiplier sections.

A power supply used in connection with the apparatus may be of fixed voltage or adjustable voltage type. The position at which the any power supply is connected with reference to the high energy conversion dynode, or to any dynode in the dynode chain of the electron multiplier section may be selected according to linearity or gain requirements of the apparatus, or indeed any other requirement. In some embodiments, a power supply may be configured to apply voltage to only a single dynode, or to a group of dynodes.

As is understood by the skilled artisan, a voltage divider chain may be used to distribute voltage from a power supply to a set of dynodes. The divider chain may comprise a series of resistors disposed between the dynodes. The voltage divider chain may be purely passive, composed of resistive elements only, or it may contain components active in voltage regulation such as diodes or transistors. Where a terminal dynode is involved, a resistor is typically disposed between the terminal dynode and the ground or reference voltage. As an alternative a zener diode may be used in this position.

In the context of a mass spectrometer, ions that have passed through the mass separator are accelerated onto the conversion dynode to which a high voltage is applied. Electrons (or ions) emitted from the conversion dynode by the incident ions then enter the first dynode of an electron multiplier where secondary electrons are emitted from the secondary emissive surfaces.

The skilled person is entirely familiar with the materials, physical and function configurations of an emissive surface in this context, an exemplary type being that provided by a dynode.

As is conventional in an electron multiplier, a first electron emissive surface (of the first dynode in a series of dynodes) is provided which is configured to receive an input particle, and in response to the impact of the input particle emit one or multiple electrons. Where multiple electrons are emitted (which is typical), an amplification of the input signal results. As is also conventional, a series of second and subsequent electron emissive surfaces is provided. The function of these emissive surfaces is to amplify the electron (s) which are emitted from the first emissive surface. As will be appreciated, amplification occurs typically at each subsequent emissive surface of the series of emissive surfaces. Typically, the secondary electrons emitted by the final emissive surface are directed onto an anode surface, with the current formed in the anode feeding into a signal amplifier and subsequently an output device.

In the present invention, the electron multiplier may have a low sensitivity section that is configured to detect ions present at relatively high concentrations, and a high sensitivity section that is configured to detect ions present at relatively low concentrations.

Differential sensitivities may be provided by any means deemed suitable by the skilled artisan including the use of signal amplifiers, for example whereby the signal output of a high sensitivity section is amplified while the signal output of the low sensitivity section is not. Alternatively, where the multiplier is comprised of discrete dynodes the level of secondary electron emissivity of dynodes may be higher in the high sensitivity section as compared with the low sensitivity section. For example, dynodes in the high sensitivity section may be fabricated from materials which are of a higher emissivity or have a large impact area as compared with dynodes in low sensitivity section.

More typically however, differential sensitives of the electron multiplier sections result from the multiplication of the gains in the high and low sensitivity sections. The higher gain of the high sensitivity section is achieved because it is multiplied by the gain of the preceding low sensitivity section.

In the electron multiplier of the apparatus, the low sensitivity section may be an analogue section (which may be considered as a low gain section) and the high sensitivity section may be a digital section capable of pulse counting (which may be considered as a high gain section). The effective gain out of the digital section is approximately the product of the gain of the analog section and the digital section. Accordingly, it will be understood that in isolation the two sections may have the same gain, but the digital section has a higher output gain because its gain is multiplied by that of the preceding analog section. Put another way, the digital section may be referred to as the high gain section because the signal provided by it is at a higher gain than the signal provided by the analog section because it is the product of the gains of the two (analogue and digital) sections. The gain signal provided by the digital section is the total gain—the product of the gains of the two (analogue and digital) sections.

In any event the high sensitivity (digital) section is adapted to detect ions which occur in low numbers. The output of the digital section comprise pulses resulting from single ions that have been provided with sufficient gain as to all be detected by pulse counting detection electronics. An electronic timer or counter is typically employed to process the output pulses. As one example, a counter that is associated with a predetermined time window may be incremented whenever a signal is generated in that time window.

In operation, the pulse count section has a limited range given that very high ion flux causes saturation, in which case the analog section of the multiplier provides a useful output signal. In the present apparatus, the two sections may be operable simultaneously by way of two dynode sets arranges in series, with an intermediate "splitting" dynode, a ground dynode, and a protection (gate) dynode. The output signal of the analog section is extracted onto the analog collector via the "splitting" dynode. The portion of the signal that travels through the holes of the splitting dynode is the analog output. The portion of the signal that does not travel through the holes is passed to the digital (pulse) section of the electron multiplier for further gain amplification.

Figure 8A:
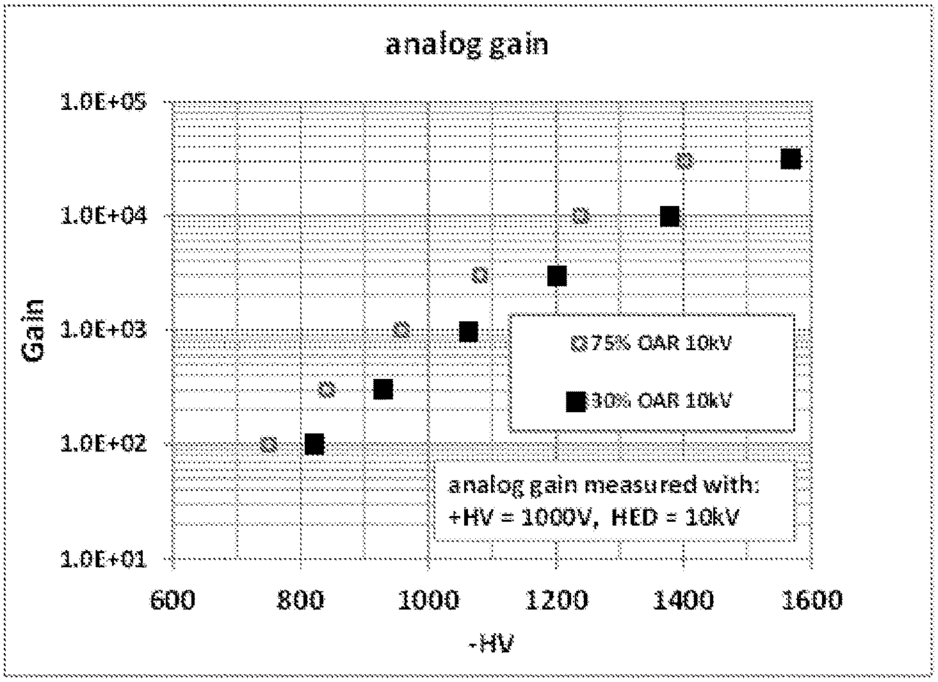
FIG. 8A is an analog gain curve for an electron multiplier having a splitting dynode having an open area ratio (OAR) of 30%, compared to a splitting dynode having an open area ratio of 75%.
Figure 8B:
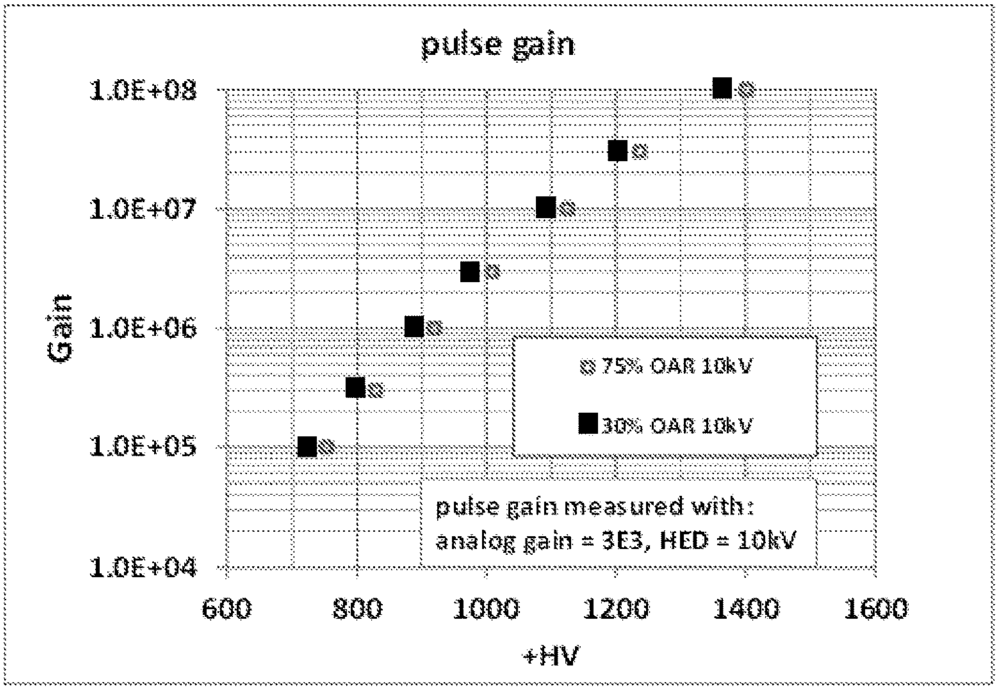
FIG. 8B is a pulse gain curve for an electron multiplier having a splitting dynode having an open area ratio of 30%, compared to a splitting dynode having an open area ratio of 75%. For both electron multipliers, the high energy conversion dynode was biased at −10 kV.

The analogue and pulsed sections of the electron multiplier may be described by reference to a "split ratio". For example, a first electron multiplier may have a splitting dynode with an open area ratio (i.e. the total area of all holes in the dynode) of 30%. The splitting dynode in this case provides a nominal 30% extraction of the signal for the analog section, and 70% transmission to the pulsed section. A second electron multiplier may have a splitting dynode with an open area ratio of 75%. The splitting dynode in this case will provides a nominal 75% extraction of the signal for the analog section, and 25% transmission to the pulsed section. The differential split ratios of the first and second electron multipliers result in differential gains, as shown in FIG. 8.

Ions which impact on the first dynode stage produce an electron signal, a portion of which is collected at the analog collector so as to result in an analog signal output. The voltage on the protection dynode is set at a level such that the remaining electrons pass through the second stage to produce a digital (pulse count) output signal. Where the pulse signal rises to a predetermined level (a level that occurs in response to a relatively high ion flux), the elevated pulse signal causes the application of a suitable voltage to the protection dynode to prevent electrons from entering the second stage and damaging the detector.

The use of an electron multiplier having a low sensitivity section and a high sensitivity section provides, in some embodiments, for significant enhancement in dynamic range of the detector. Applicant has found in particular that reducing the internal resistance of the detector apparatus (including both the high gain section and the low gain section of the electron multiplier) provides for overall enhanced dynamic range in ion detection. Other advantages are provided as discussed further infra in relation to certain preferred embodiments.

In some embodiments of the apparatus, the conversion dynode is physically disposed within or about the electron multiplier. A conversion dynode may be considered within the electron multiplier where it is disposed (completely, or in part) within the bounding volume defined by the hard surfaces of the electron multiplier. Alternatively, the conversion dynode may be proximal to any externally facing surface of the electron multiplier, with the term "proximal" including any distance of less than about 1, 2, 3, 4, 5, 6, 7, 8, 9, 10, 15, 20, 25, 30, 35, 40, 45, 50, 55, 60, 65, 70, 75, 80, 85, 90, 95 or 100 mm.

The term "within or about" within this context may be defined by reference to a distance between the first electron emissive surface of the electron multiplier and the conversion dynode. The distance may be less than about 1, 2, 3, 4, 5, 6, 7, 8, 9, 10, 15, 20, 25, 30, 35, 40, 45, 50, 55, 60, 65, 70, 75, 80, 85, 90, 95 or 100 mm.

In some embodiments, the conversion dynode is immediately adjacent to the first dynode of the electron multiplier.

As will explained further infra, advantage is gained where the conversion dynode is separately powered or electrically uncoupled from the electron multiplier so as to allow the conversion dynode to be disposed within or about the electron multiplier.

Figure 1B:
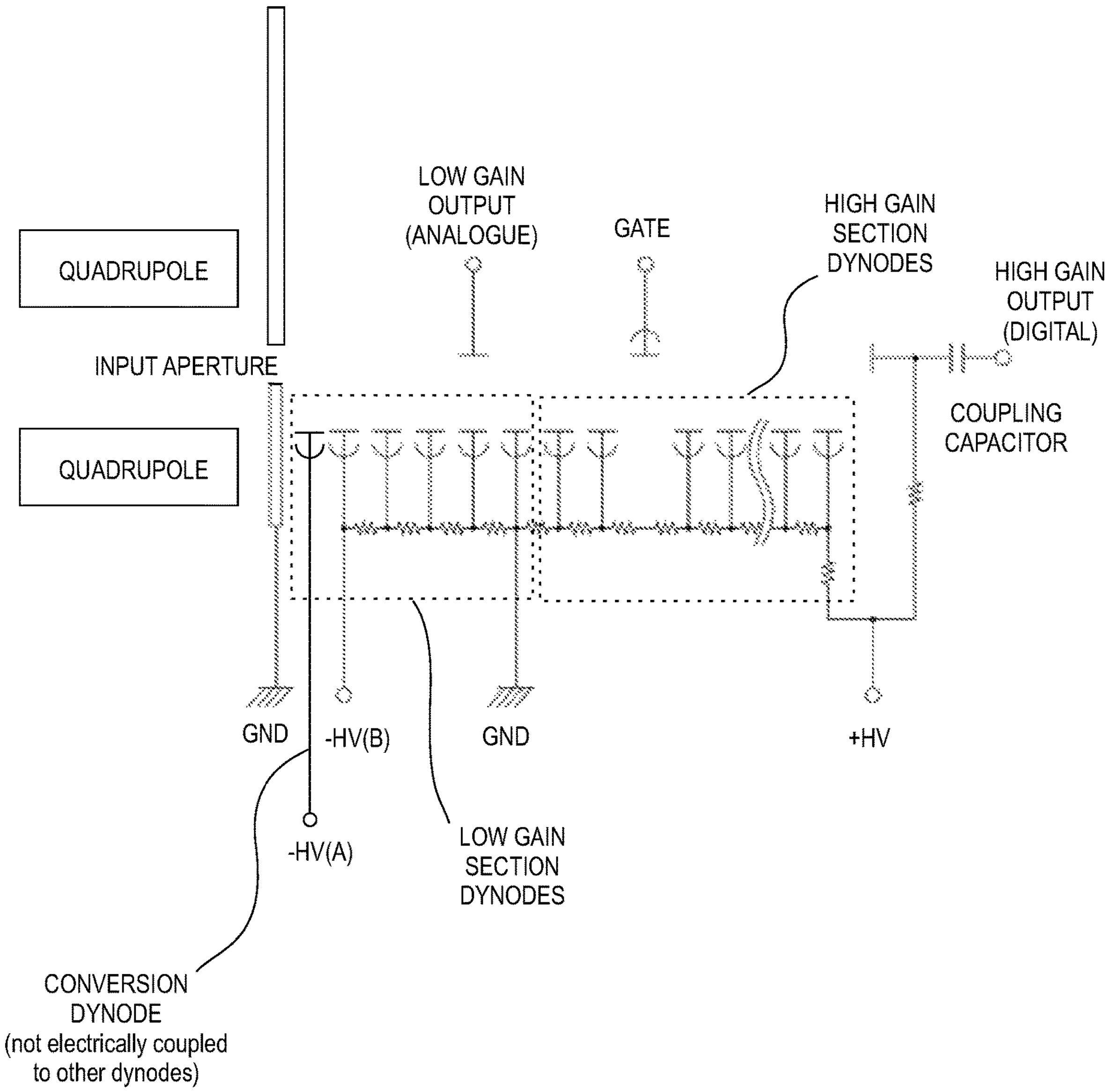
FIG. 1B shows diagrammatically a preferred apparatus whereby the conversion dynode is contained within the structure of the electron multiplier.

Reference is now made to FIG. 1A and FIG. 1B showing an exemplary apparatus of the present invention in highly diagrammatic form. In this embodiment, positive ions are accelerated and focused by the quadrupoles so as to pass through the input aperture of the apparatus. The ions then travel to the high energy conversion dynode which emits secondary electrons (or ions). The curved emissive surface of the conversion dynode focuses the secondary electrons (or ions) into the electron multiplier, and firstly to the left hand-most dynode (considered the first dynode of the low gain section of the electron multiplier) which then emits further secondary electrons which are deflected to the adjacent dynode, which then emits further secondary electrodes which are deflected to the (right) adjacent dynode, and so on.

Staying with the embodiments of FIG. 1A and FIG. 1B, for positive ion detection the high energy conversion dynode will have a high voltage bias −HV(A) which is higher (or of a significantly larger magnitude, or further away from zero) as compared with that of the first dynode which has a high voltage bias −HV(B). Voltage biases for the detection of negative ions are shown in FIG. 2B and FIG. 2D.

The path by which charged particles travel through the present apparatus is clearly shown in FIG. 2A, FIG. 2B, FIG. 2C and FIG. 2D.

Figure 2A:
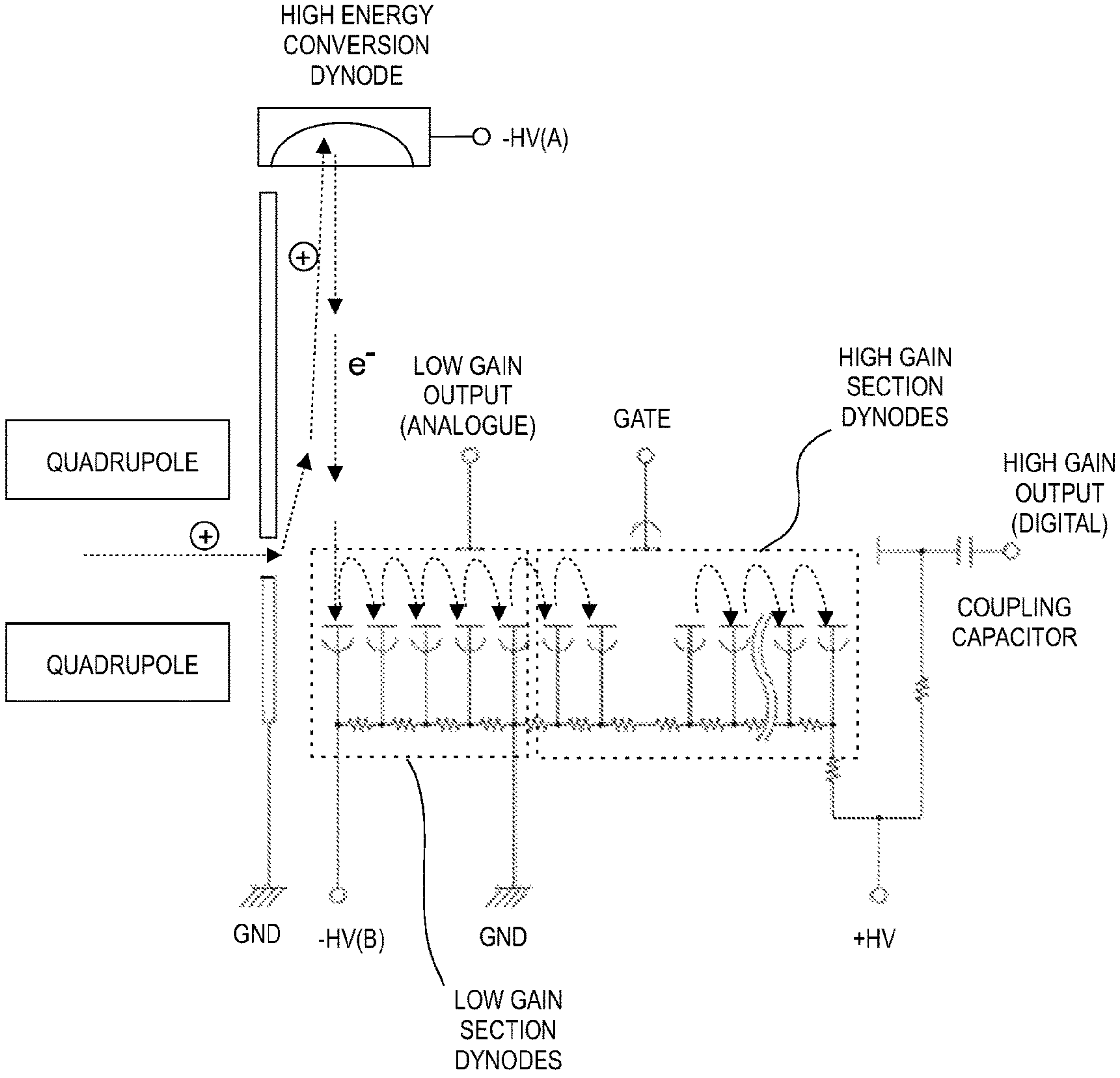
FIG. 2A shows diagrammatically the apparatus of FIG. 1, but showing the path of charge particles: positive ions to the point of impact on the high energy conversion dynode, and electrons from the conversion dynode to the dynodes of the electron multiplier.
Figure 2B:
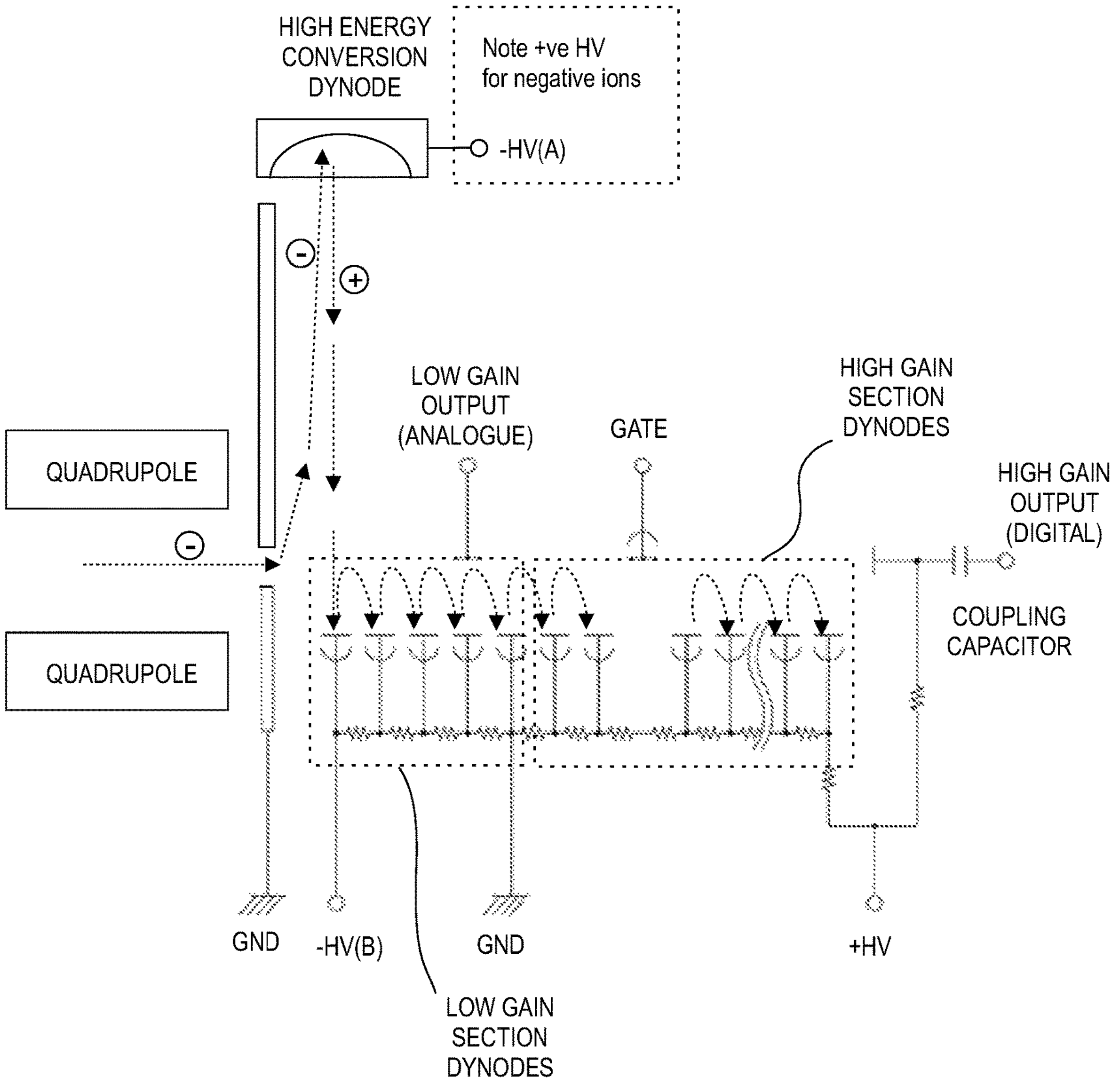
FIG. 2B shows diagrammatically the apparatus of FIG. 2A, configured to detect negative ions. Negative ions travel through the input aperture to the conversion dynode from which positive ions are emitted. The positive ions travel to the first dynode of the electron multiplier.

In the embodiment of FIG. 2A and FIG. 2B, the first five dynodes (as counted from the first dynode of the low gain section left) constitute the low gain portion of the electron multiplier. The output signal resulting from electrons emitted and amplified by the first three dynodes is analogue.

The sixth and subsequent dynodes constitute the high gain portion of the electron multiplier. The output signal resulting from electrons emitted and amplified by the sixth and subsequent dynodes is a pulsed (digital) signal which (by way of further electronics not shown) can be used to provide a count output. As discussed infra, preferred forms of the apparatus have higher dynode numbers such as 12 dynodes in the low gain section and 17 dynodes in the high gain section.

In the preferred embodiments of FIG. 1A and FIG. 1B, it will be noted that the conversion dynode is biased at a highly negative voltage (such as −10 kV), this being required where the incoming ions are positively charged. As will be understood by the skilled artisan, where the incoming ions are negatively charged then then conversion dynode is biased at a highly positive voltage (such as +10 kV). Where the particles emitted by the high energy conversion dynode are negative (i.e. electrons), the first dynode in the low gain section of the electron multiplier is negative (such as −2 kV).

Where the incoming ions are negative, the high energy conversion dynode releases positive ions on impact the first dynode is also negative (such as −2 kV)

According to the present invention, where the high energy conversion dynode is biased at a negative voltage, the first dynode of the low gain section of the electron multiplier is biased at a less negative voltage (i.e. closer to zero). Where the high energy conversion dynode is biased at a positive voltage, the first dynode of the low gain section of the electron multiplier is typically biased at a negative voltage.

Figure 2C:
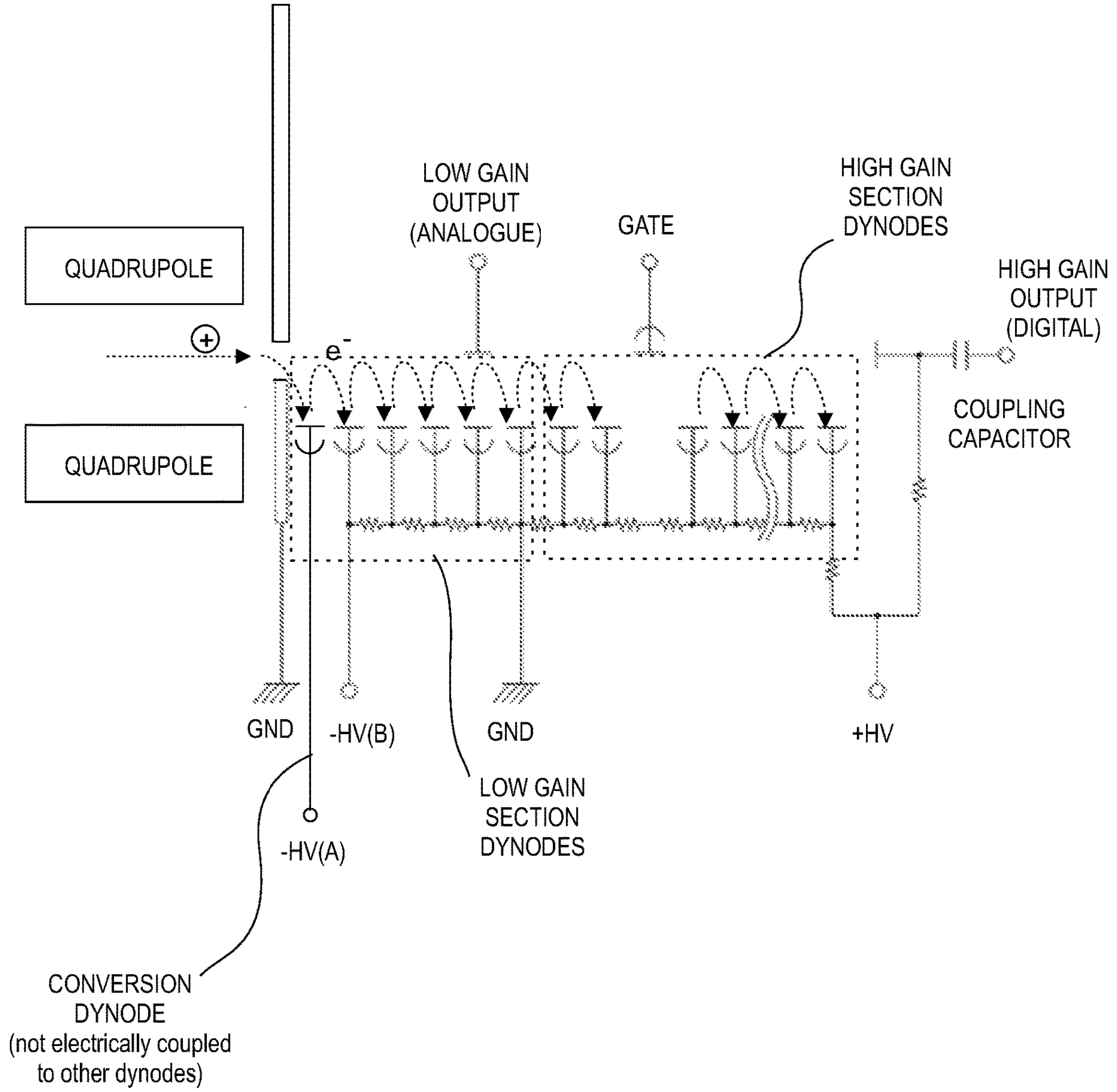
FIG. 2C shows diagrammatically the apparatus of FIG. 1B, configured to detect positive ions and having a conversion dynode contained within the structure of the electron multiplier.
Figure 2D:
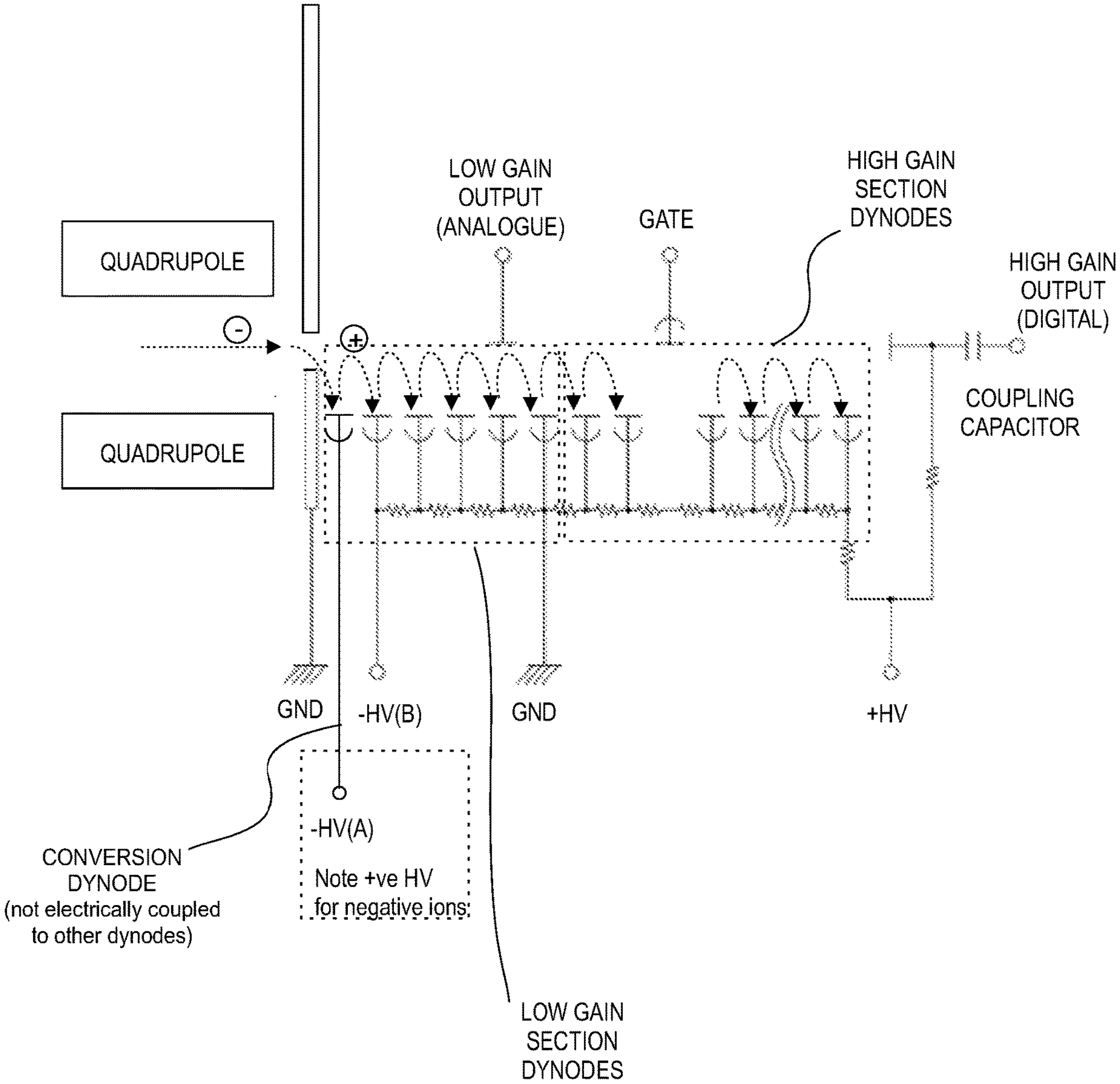
FIG. 2D shows diagrammatically the apparatus of FIG. 1B, configured to detect negative ions and having a conversion dynode contained within the structure of the electron multiplier.

As will be appreciated from FIG. 1B, FIG. 2C and FIG. 2D, the function of the high energy conversion dynode shown in FIG. 1A, FIG. 2A, and FIG. 2B may be replaced by a conversion dynode which is physically positioned within or about the electron multiplier. This provides advantage in ease of construction, space saving, and furthermore provides that a combined converter/multiplier may be used thereby minimising any difficulty in replacement of the part. For embodiments having a conversion dynode which is physically positioned within or about the electron multiplier, the conversion dynode may have a relatively moderate voltage bias applied (such as less than about 5, 4, 3, 2, or 1 kV). Generally, a conversion dynode voltage bias of less than about 3 kV allow for the conversion dynode to be brought into close physical proximity to the electron multiplier without any substantial deleterious effect to the multiplier function.

Figure 1C:
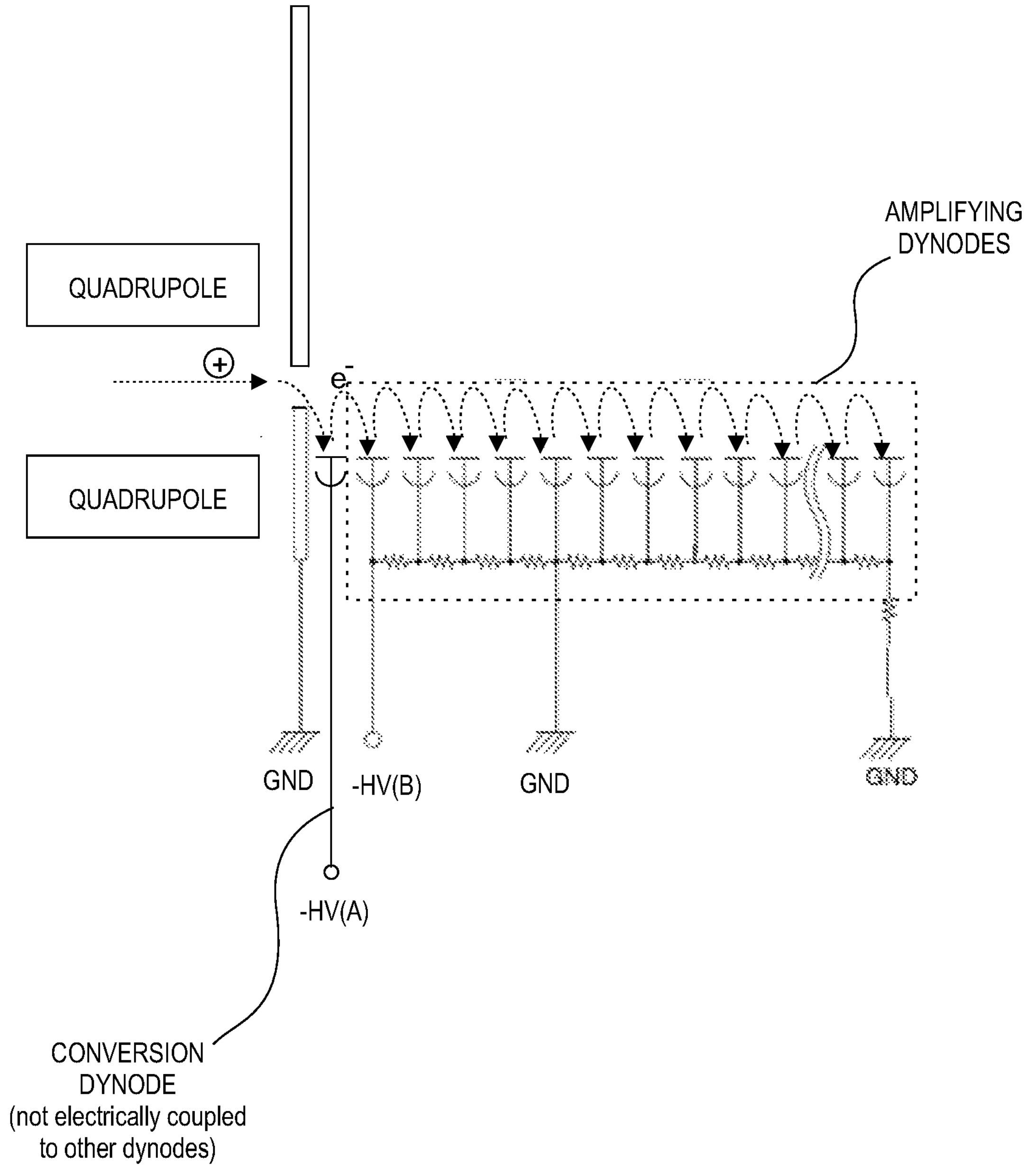
FIG. 1C shows diagrammatically a preferred apparatus whereby the conversion dynode is contained within the structure of the electron multiplier. This apparatus is devoid of the high gain and low gain sections present in other embodiments of the invention, and instead comprises only a single gain section. This embodiment may be used in conjunction with analog or pulse counting detection electronics.

As will be appreciated from FIG. 1C, the electron multiplier section of some embodiments of the apparatus is a single gain multiplier. In such circumstances, all dynodes of the electron multiplier form a single gain section, as distinct from the high gain and low gain sections of other embodiments disclosed herein. In the embodiment of FIG. 1C, advantage is gained by the conversion dynode being (i) physically disposed within the electron multiplier and (ii) separately powered or electrically uncoupled from the electron multiplier.

In one aspect, the present invention further provides for a replacement part or replaceable part for use with a particle detection apparatus (such as a mass spectrometer) that comprises both a conversion dynode and a chain of multiplier dynodes, wherein the replacement part or replaceable part is configured so as to allow for the conversion dynode to be powered separately to the chain of multiplier dynodes.

The electrical resistance of the electron multiplier (i.e. the combination of the high sensitivity and low sensitivity sections) is set to a level which is lower than that noted for prior art electron detectors, and such that dynamic range of the electron multiplier is enhanced.

In addition or alternatively to reducing the internal resistance, or as a natural result of reducing the internal resistance, the apparatus is configured such that the high sensitivity section and the low sensitivity section of the electron multiplier are operable at linear output currents of at least about 50, 75 or 100 μA. For both the high sensitivity section and the low sensitivity section of the electron multiplier, this represents an approximately 10-fold increase over currents utilized in prior art apparatus.

It should be noted that where differential currents flowing through the various dynodes is required the use of separate power supplies configured to apply bias voltages of different magnitudes to selected dynode(s) is one means of achieving the differential currents.

Without wishing to be limited by theory in any way, since the dynamic range of the detector is the product of the dynamic range of the low gain section and the high gain section, the overall increase of the dynamic range of the detector may be in some embodiments at least one order of magnitude or two orders of magnitude higher than typical commercial detectors.

Figure 3:
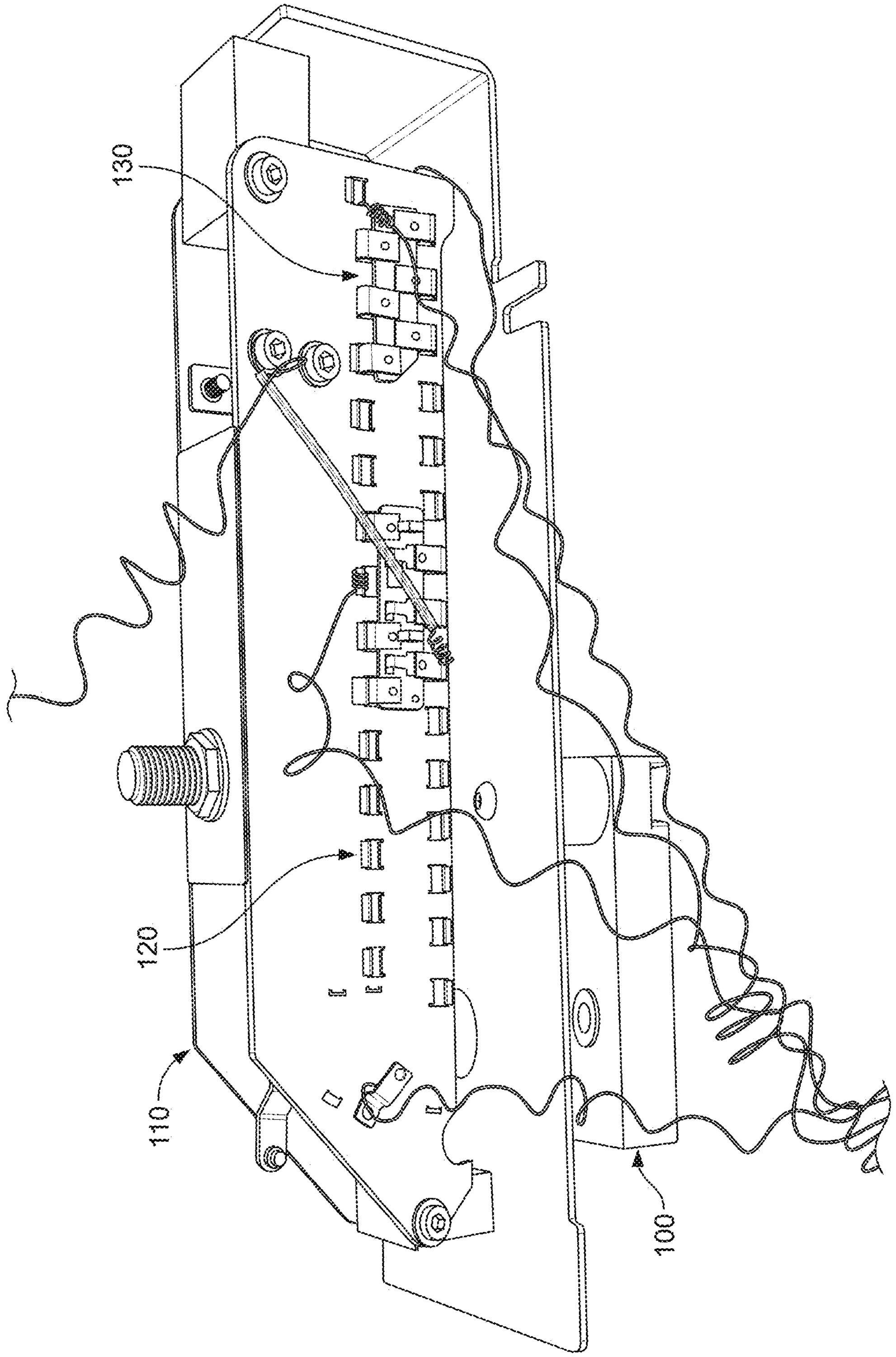
FIG. 3 is a photograph of a prototype of a preferred apparatus of the invention showing the main physical features as presented externally.

Reference is now made to FIG. 3 which shows a prototype apparatus of the present invention constructed broadly according to the scheme of FIG. 1A. The high energy conversion dynode is shown at 100, with the electron multiplier shown at 110. The electron multiplier 110 has a low gain portion about 120, and a high gain portion about 130.

Figure 4:
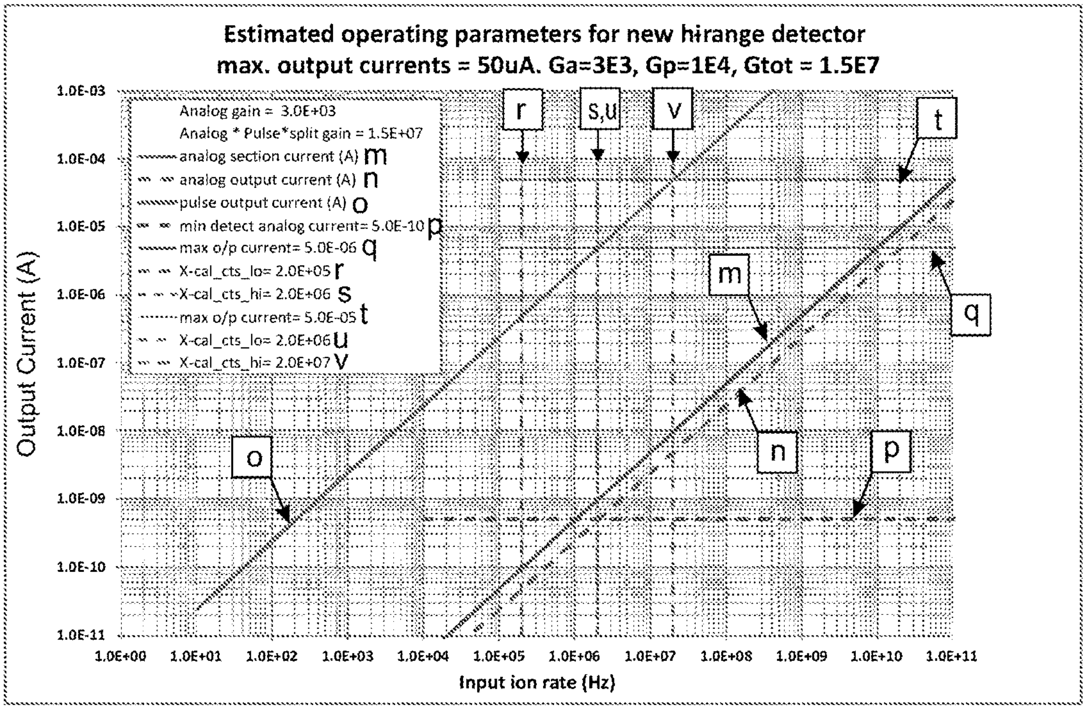
FIG. 4 shows model operating parameters for the prototype apparatus of FIG. 3. Letters "m" through "v" are used only to identify curves.

Turning now to FIG. 4, certain operating parameters of an apparatus of the present invention have been estimated via modelling.

Without wishing to be limited by theory in any way, it is proposed that dynamic range may be enhanced by reducing the internal resistance of the detector. The pulse counting section (i.e. the high sensitivity section) and the analog section (i.e. the low sensitivity section) are both designed to operate at linear output currents of at least 50 uA. For each section, this is approximately an order of magnitude higher than in typical prior art detectors which are commercially available.

Since the dynamic range of the detector is the product of the dynamic range of the analog and pulse counting sections, the overall increase of the dynamic range in the new detector is, in principle, two orders of magnitude higher than typical commercial detectors.

To increase the service life, gain stability and reduction in the rate of differential of the apparatus, dynode numbers have been increased in each section: 12 dynodes were used in the analog (i.e. the low sensitivity) section and 17 dynodes were used in the pulse counting (i.e. high sensitivity) section.

It is expected that a benefit in using a conversion dynode that is separately powered is that extra service life for the detector is provided. As mentioned supra, in prior art detectors used for applications such as inductively coupled mass spectrometry the starting voltage (−HV) of the analog section is usually elevated to about −1600V to ensure adequate ion to electron conversion efficiency. With the introduction of a high energy conversion dynode, the conversion dynode voltage may be decoupled from the voltage required to provide the analog gain. Consequently, the analog section of the multiplier can be operated with much lower initial −HV voltages, thereby providing extra voltage overhead for longer life.

Figure 5A:
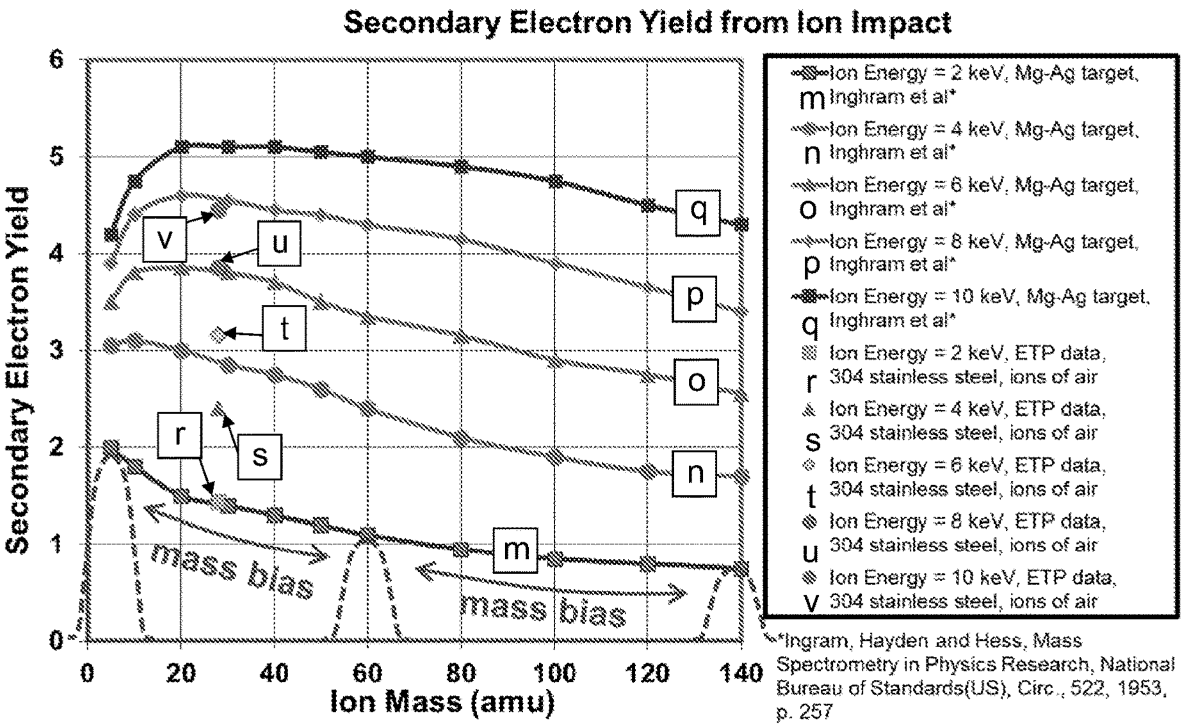
FIG. 5A is a graph showing secondary electron yield from ion impact as a function of ion mass and energy. The variation in secondary electron yield with mass creates the "mass bias" effect in spectra. Letters "m" through "v" are used only to identify curves.

With regard to the efficiency of detection of incoming ions, when energetic ions are incident on a surface, secondary electrons are emitted according to a Poisson distribution with a mean that is dependent on the mass and energy of the ion, and also the material of the emissive surface. The secondary ion yield corresponds to the mean of the Poisson distribution for the number of emitted ions. The trends and values in FIG. 5A are typical of what may be expected from stainless steel and magnesium/silver conversion dynodes.

The Poisson distribution of the emitted electrons from the ion-electron conversion process is a determining factor of the shape of the pulse height distribution (PHD) from an electron multiplier, and it also places a fundamental limit on the detection efficiency.

Figure 5B:
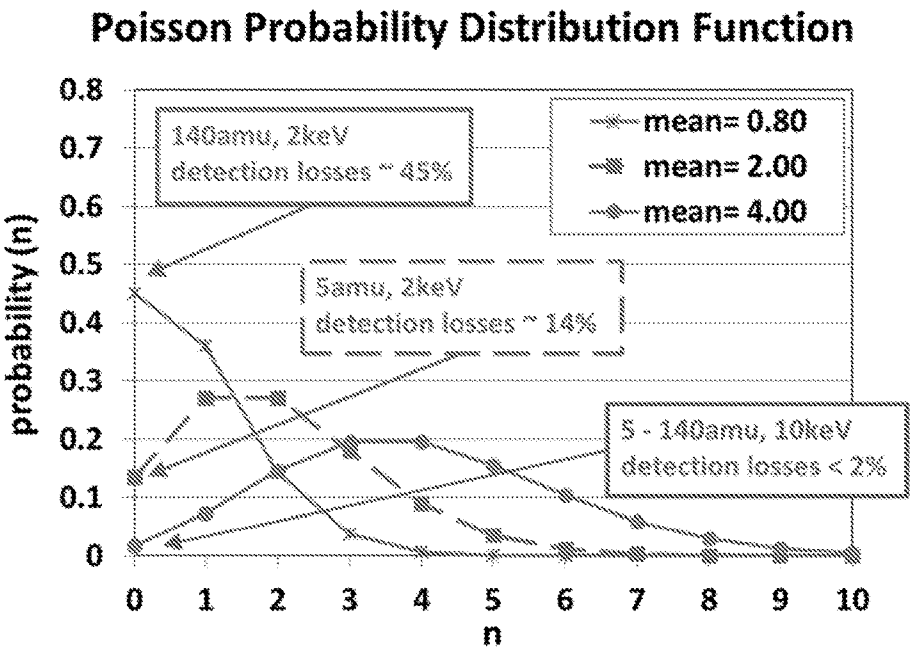
FIG. 5B is a graph showing Poisson probability distribution functions for mean=0.8, 2.0 and 4.0. The maximum possible detection efficiency is limited by Poisson statistics.

For secondary electron emission distributions with low mean values, there is a significant probability that zero electrons will be emitted when an ion is incident on the conversion surface. For a distribution with mean=0.8, there is a probability of ~0.45 that zero secondary electrons will be emitted (see FIG. 5B) i.e. the maximum possible detection efficiency for species with a mean secondary electron yield=0.8 is about 55%. For species with yield=2, the probability of zero secondary electrons falls to about 0.14, increasing the maximum possible detection efficiency to about 86%.

When the yield increases to 4, detection efficiencies of 98% may result, such efficiencies being highly desirable especially where low concentrations of a target ion are present in a sample. Yields of 4 are achievable because of the incorporation of a high energy conversion dynode. This provides advantages in detection efficiencies achievable in comparative detectors that are devoid of a high energy conversion dynode disposed before the first dynode of the low gain region of an electron multiplier.

For a given impact energy the variation in the secondary electron yield with mass leads to a mass bias in a spectrum. The data shown in FIG. 5A shows that for impact energies of 2 keV, the secondary electron yield varies from a maximum of about 2 to a minimum of about 0.8. That is to say, the maximum yield (at 5 amu) is about 2.5-fold higher than the minimum yield (at 140 amu). For impact energies of 10 keV, the secondary electron yield varies from a maximum of about 5.1 to a minimum of about 4.2. In this case, the maximum yield is only about 1.2-fold higher than the minimum yield.

To obtain the same or similar level of signal from a multiplier with a secondary electron yield of about 4.2 for a 140 amu ion, a multiplier with a yield of about 0.8 for a 140 amu ion would need to operate at a gain of about 5.2-fold (=4.2/0.8) higher than that detector. The need to operate at higher gain may reduce the service life of a detector, this being a disadvantage of prior art detectors when compared to the present apparatus.

The linearity level of the prototype may be measured. To obtain an analog output current of 50 uA at a gain of 3e3, an input ion current of greater than about 16 nA is required. Ion currents of this magnitude are obtainable from a mass spectrometry instrument, for example.

Figure 6A:
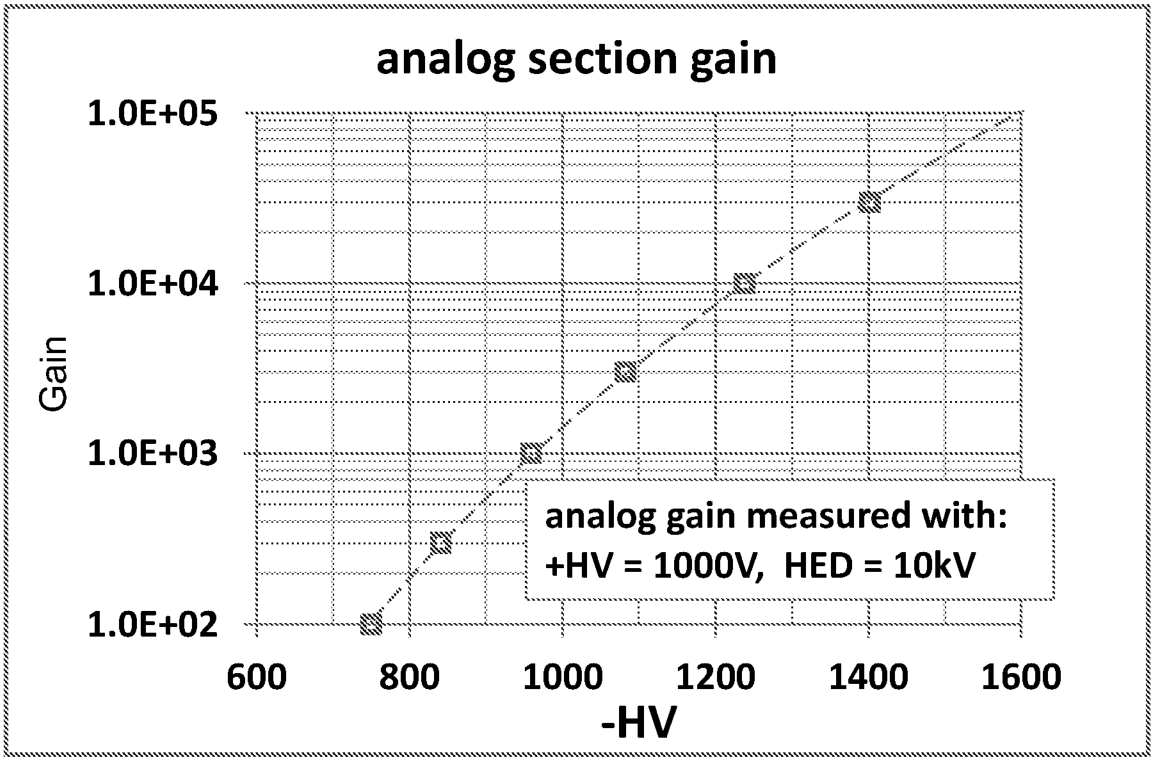
FIG. 6A is a gain curve generated from low gain (analog) section of the prototype detector of FIG. 3.
Figure 6B:
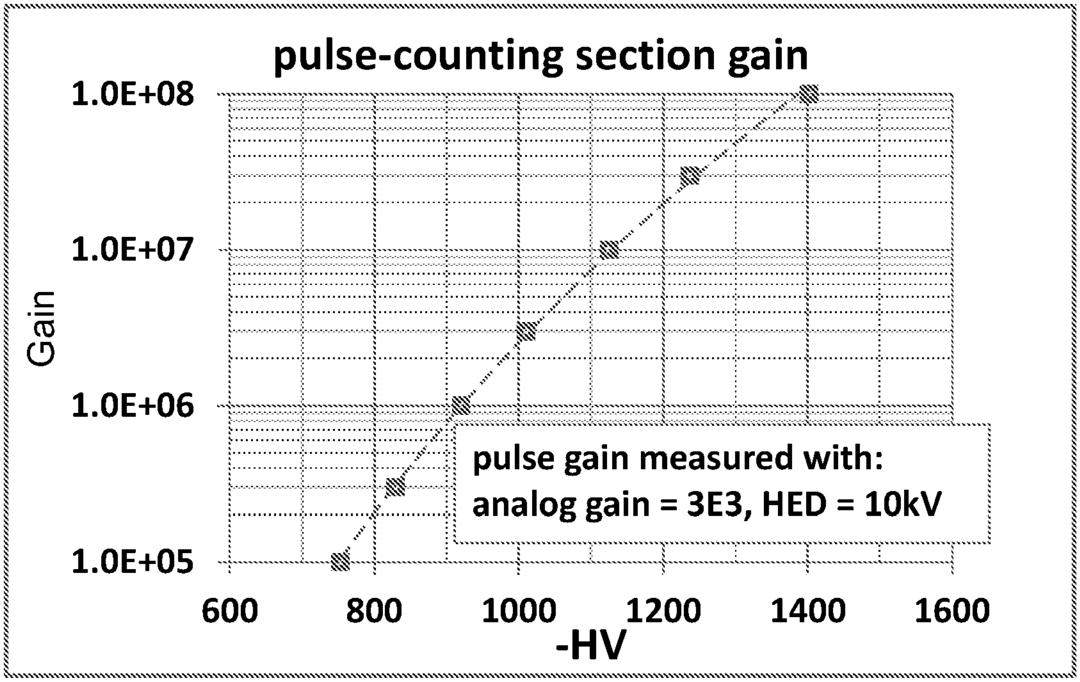
FIG. 6B is a gain curve generated from high gain (pulse output) section of the prototype detector of FIG. 3.
Figure 7:
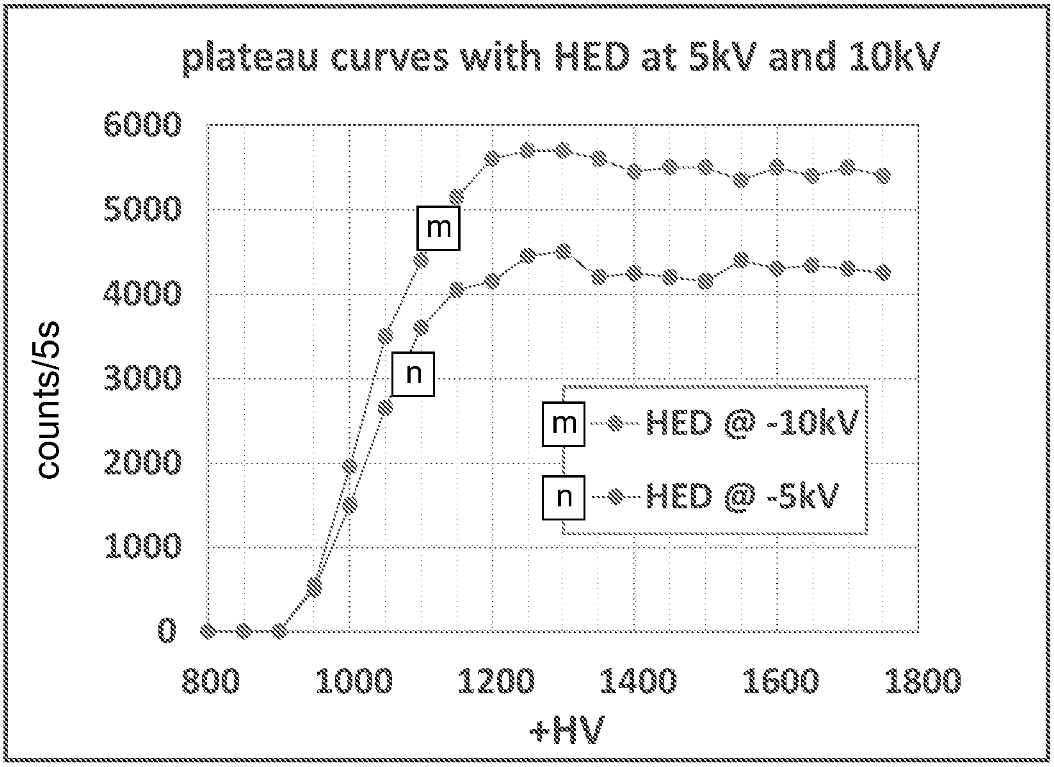
FIG. 7 shows plateau curves generated from the prototype detector of FIG. 3 with the high energy conversion dynode biased at −5 kV and −10 kV. Letters "m" and "n" are used only to identify curves.

Gain curves have been generated for the low gain (analog) section (see FIG. 6A) and the high gain (pulse-counting) section (see FIG. 6B) for the prototype detector shown in FIG. 3. To obtain an analog gain of about 3e3 a starting voltage of about 1100V is called for. This is about 500V lower than the starting voltages typically applied to the analog section of ICP-MS detectors.

Advantageously, the prototype detector shown in FIG. 3 has been demonstrated to produce high quality plateau curves with −5 kV or −10 kV applied to the high energy conversion dynode (see FIG. 5). This is a manifestation of the improved pulse height distribution due to the increased secondary electron yield from the conversion dynode. High quality plateau curves enable the reliable setting of the pulse counting operating voltage.

Quite apart from any functional improvements in operation, the incorporation of a discrete high energy conversion dynode provides for flexibility in the mechanical design of a detector. In some embodiments, the electron multiplier can be rotated in any direction above the conversion dynode thereby allowing axial or radial orientation with respect to a quadrupole. Reference is made to FIG. 3 showing a prototype detector having a high energy conversion dynode 100 in operable connection with a discrete dynode electron multiplier 110 having a high sensitivity section and a low sensitivity section.

The present apparatus is particularly useful as a detector component in a mass spectrometry instrument, including instruments used in applications whereby very low abundance ions are required to be detected. Such applications include inductively coupled mass spectrometry. Accordingly, in one aspect the present invention provides for the combination of an inductively coupled mass spectrometry instrument and an apparatus as described herein.

The instrument may comprise means for ionizing the sample by way of an inductively coupled plasma.

An inductively coupled plasma is a plasma that is generally produced by heating a gas with an electromagnetic coil, the gas containing a sufficient concentration of ions and electrons to make it electrically conductive. The plasma is generally sustained in a torch of the instrument that consists of three concentric tubes (typically quartz), the end of the torch being disposed inside the induction coil. The instrument typically comprises means for introducing argon between the two outermost tubes of the torch, with an electric spark being applied intermittently to introduce free electrons into the gas stream. The electrons are accelerated and may collide with an argon atom to cause release of an electron which is in turn accelerated. The process continues until the rate of release of new electrons in collisions is balanced by the rate of recombination of electrons with argon ions (atoms that have lost an electron). The temperature of the plasma is of the order of 10,000 K.

The present apparatus may be configured physically and/or structurally so as to be operable with existing commercially available ICP-MS instruments. By way of example only, the present apparatus may be configured to be operable as an electron multiplier in any of the ICP-MS instruments supplied by Agilent™ such as the models 7800, 7900, 8900 Triple Quadrupole, 8800 Triple Quadrupole, 7700e, 7700x, and 7700s, or PerkinElmer™ such as models NexION2000, N8150045, N8150044, N8150046, and N8150047, or ThermoFisher Scientific such as models iCAP RQ, iCAP TQ, and Element Series, or Shimadzu such as model ICPMS-2030.

The electron multiplier component of the present apparatus has been exemplified by way of linear, discrete dynode multipliers. Given the benefit of the present specification the skilled artisan is enabled to routinely test other types of multiplier types for suitability with the present invention. For example, a continuous (channel) dynode may be used in place of a discrete dynode electron multiplier. In that case, the apparatus may comprise a high energy conversion dynode in combination with a continuous dynode.

Furthermore, while the present apparatus is particularly advantageous with respect to ICP-MS instruments and components thereof, it is not intended that the ambit of the present application is so restricted. It is contemplated that at least some features of the present invention may be applied to non-ICP-MS instruments and components thereof. For example, the use of high gain and low gain section dynodes in an electron multiplier may nevertheless provide advantage, as may the integration of a separately powered conversion dynode into the structure of an electron multiplier. The skilled person may use routine methods to test the usefulness of the present invention in respect of a range of existing mass spectrometry instruments and components thereof, and even for applications not related to mass spectrometry.

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Functionality may be added or deleted from the diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A particle detector comprising an electron multiplier and a conversion dynode, wherein the electron multiplier comprises a plurality of dynodes in an amplification chain configured to form an amplified electron signal output from a charged particle emitted by a conversion dynode, and wherein the electron multiplier is rotatable in any direction above the conversion dynode.

2. The particle detector of claim 1, wherein the conversion dynode is powered by a first power supply that is separate to a second power supply that powers the electron multiplier.

3. The particle detector of claim 2, wherein the first and second power supplies are set so as to supply different currents and/or voltages to the conversion dynode and the electron multiplier respectively.

4. A method of arranging a particle detector within a mass spectrometer, the particle detector comprising an electron multiplier and a conversion dynode, the electron multiplier being rotatable in any direction above the conversion dynode, the method comprising:

rotating the electron multiplier in any direction above the conversion dynode.

5. The method of claim 4, wherein rotating the electron multiplier comprises orienting the electron multiplier axially or radially with respect to a quadrupole of a mass spectrometer within which the electron multiplier and the conversion dynode are disposed.

* * * * *